(12) United States Patent
Weavers et al.

(10) Patent No.: US 7,008,540 B1
(45) Date of Patent: Mar. 7, 2006

(54) ULTRASONICALLY CLEANED MEMBRANE FILTRATION SYSTEM

(75) Inventors: Linda Kay Weavers, Upper Arlington, OH (US); Harold W. Walker, Dublin, OH (US); Mikko O. Lamminen, Columbus, OH (US); Dong Chen, Columbus, OH (US)

(73) Assignee: The Ohio State University, Columbus, OH (US)

( * ) Notice: Subject to any disclaimer, the term of this patent is extended or adjusted under 35 U.S.C. 154(b) by 195 days.

(21) Appl. No.: 10/434,480

(22) Filed: May 8, 2003

Related U.S. Application Data

(63) Continuation of application No. 10/408,763, filed on Apr. 7, 2003, now abandoned.

(51) Int. Cl.
*B01D 65/02* (2006.01)

(52) U.S. Cl. ............ 210/636; 210/321.69; 210/321.87; 210/785

(58) Field of Classification Search ............. 210/195.2, 210/257.2, 258, 321.69, 321.83–321.89, 210/500.23, 636, 650, 652, 384, 388, 785; 55/292
See application file for complete search history.

(56) References Cited

U.S. PATENT DOCUMENTS

| | | | |
|---|---|---|---|
| 4,158,629 A * | 6/1979 | Sawyer | 210/137 |
| 4,253,962 A * | 3/1981 | Thompson | 210/414 |
| 5,062,965 A | 11/1991 | Bernou et al. | |
| 5,900,043 A | 5/1999 | Grandjean et al. | |
| 5,919,376 A | 7/1999 | Carman | |
| 6,080,317 A * | 6/2000 | Wagner et al. | 210/652 |
| 6,161,435 A | 12/2000 | Bond et al. | |
| 6,221,255 B1 | 4/2001 | Vadoothker | |
| 6,395,186 B1 | 5/2002 | De Kock et al. | |
| 6,432,310 B1 * | 8/2002 | Andou et al. | 210/636 |
| 6,797,158 B1 | 9/2004 | Feke et al. | |
| 6,878,294 B1 * | 4/2005 | Ando et al. | 210/798 |
| 2002/0091350 A1 * | 7/2002 | Belson | 604/5.04 |
| 2004/0016699 A1 * | 1/2004 | Bayevsky | |

* cited by examiner

*Primary Examiner*—Joseph Drodge
(74) *Attorney, Agent, or Firm*—Dinsmore & Shohl LLP

(57) ABSTRACT

A filtration system and a method of cleaning a particle and/or colloidal fouled filtration membrane are provided. The filtration system includes at least one filtration membrane disposed in a casing, and at least one ultrasonic transducer in direct contact with a fluid to be filtered. Ultrasonic energy is emitted by the ultrasonic transducer in the direction of the filtration membrane. Dislodged particles cleaned by the ultrasonic energy from the filtration membrane are carried away in a cross-flow stream and wasted or recycled back to the beginning of the treatment process. The ultrasonic transducer can be fixed or movable. The filtration system can use different filtration membrane configurations such as, but not limited to, tubular, flat sheet, hollow fiber and spiral wound membranes.

20 Claims, 8 Drawing Sheets

ULTRASONICALLY CLEANED MEMBRANE FILTRATION SYSTEM

This application is a continuation of U.S. patent application Ser. No. 10/408,763, filed Apr. 7, 2003, now abandoned.

BACKGROUND OF THE INVENTION

The invention relates to a filtration system comprising a device for the ultrasonic cleaning of its filtering elements and a corresponding cleaning process.

Systems are known which are used for the filtration of liquids and which comprise, within a casing, a set of filtering elements made of porous material(s) or membranes. The use of membranes is a widely employed, versatile, and effective separation process. Different membrane types, ranging from micro-filtration (MF) to reverse osmosis (RO), are capable of removing suspended particles and microorganisms to rejecting virtually all ions in solution, respectively.

During the operation of the filtration system, impurities from the fluid progressively fill the interstices of the porous material and/or form a cake layer on top of the porous material. In order to maintain satisfactory conditions of operation of the filtration system, it is necessary to regenerate the filtering elements after a certain operating time.

A first method of regeneration consists in replacing all the filtering elements when the loss of head through these elements has exceeded a specified limiting value, for a given throughput. This method involves disadvantages, because it necessitates the demounting of a part of the system and because it involves the handling of a large volume of waste materials, comprising all the impurities retained by the cleaned filtering elements and these filtering elements themselves. This leads to increased labor cost and an increased period of non-availability of the filtration system; furthermore, it may be necessary to handle and to process large quantities of waste materials after cleaning of the filter. Additional difficulties arise when the filtration systems of the type described hereinabove are utilized for the processing of fluids containing impurities consisting of dangerous materials. Requiring the replacement of such filtering elements increases the risk of exposing maintenance personal to such contaminates.

A second process for the regeneration of the filtering elements of a filtration system consists in isolating the system from its normal circuit and, without demounting it, causing a certain quantity of clean fluid to pass in countercurrent through the filtering elements. These elements are then cleared of the particles retained during the operation of the system. This backwashing method avoids the demounting of the filter and the replacement of the filtering elements. However, backwashing is not ideal in that the volume of fluid necessary to carry out the cleaning may be fairly large causing possible filtration membrane degradation, and/or may necessitate the utilization of costly processing stations for the resulting highly contaminated effluent. Backwashing also requires system shutdown while the filter is cleaned.

A third process for the regeneration of the filtering elements of a filtration system consists using chemical cleaning to remove particles from fouled filtration membranes. Currently, practices of chemical cleaning are mostly based on recommendations from membrane manufactures. Some of them supply proprietary cleaners while others use commercial chemicals. Accordingly, in addition to having to isolate the filtration system from the filtration circuit, membrane degradation may be problematic due to the use of inappropriate chemicals. Further disadvantages include chemical costs, waste handling and disposal costs, and the need for additional operator safety and training to use this type of regeneration process.

A fourth process for the regeneration of the filtering elements of a filtration system consists in emitting ultrasonic energy through a casing or pressure vessel to remove particles from fouled filtration membranes. The emission of ultrasonic energy within the casing creates an acoustic pressure field. If the amplitude of this pressure field is sufficient, cavitational bubbles generate shock waves, as well as the turbulent micro-currents resulting from cavitational collapse permits the extraction of the particles filtered and collected by the porous medium. However, using ultrasound has not been without its disadvantages. For example, prior art methods have used a membrane housing or other barrier between the ultrasonic energy and the membrane surface, thereby requiring additional power input. Additionally, because such systems have an intermediate medium through which to transmit ultrasonic energy, such prior systems have also be unable to provide a uniform distribution of the ultrasonic energy to the fouled membrane surface.

Accordingly, there is a continued desire in the industry for a filtering system and corresponding ultrasonic cleaning operation that does not necessitate the demounting of the filter or disconnecting the filter from the operating circuit, which provides a more uniform distribution of ultrasonic energy, and which has a lessened power requirement.

SUMMARY OF THE INVENTION

The above mentioned needs are met by the invention which provides a filtration system comprising a casing, an inlet conduit for liquid to be filtered in the casing, an evacuation conduit for filtered liquid and a porous filtration membrane situated longitudinally between the conduits, as well as an ultrasonic transducer in direct contact with the liquid to be filtered for the ultrasonic cleaning of the porous filtration medium in an effective manner.

The present invention utilizes ultrasound to improve the performance of cross-flow membrane filtration for liquid/particle or liquid/colloid separation. The filtration system minimizes membrane fouling and/or maintains non-fouling conditions during membrane filtration processes leading to increased permeation. The ultrasonic transducer may be operated either continuously or periodically to maintain a level of permeation.

In one embodiment, the filtration system includes an electronic controller and transducers, which transform electrical energy into mechanical vibrations. The ultrasonic energy propagates toward the membrane surface through a liquid medium. Once this high-powered ultrasound is introduced into liquid solution, cavitation bubbles are formed during the rarefaction of sound waves. When the cavitation bubbles collapse, localized hot spots are formed which reach high temperatures and pressures. Associated with cavitation bubbles and ultrasonic energy, micro-streaming, micro-streamers, micro-jets, shock waves, and acoustic streaming are generated, that are capable of removing particles and the fouling layer from the membrane surface. In addition, these physical effects produced from ultrasound can both reduce concentration polarization and prevent the deposition of particles that lead to fouling.

In one embodiment, an ultrasonic transducer system is located such that cavitational effects reach the fouled surface of the membrane. Depending on characteristics of the filtration membrane and liquid medium, sound may penetrate through the filtration membrane. Therefore, the ultrasonic transducer may be oriented in any direction in relation to the filtering surface of the filtration membrane. This is applicable to all possible configurations of filtration membranes, such as flat sheet, tubular, spiral wound, and hollow fiber.

The filtration system delivers the desired magnitude of ultrasonic energy onto the surface of the filtration membrane. Based on the potential for fouling, the ultrasound may be operated in either continuous pulsed mode to maintain a high permeate flux, or only periodically to clean the filtration membrane with cycles of high flux followed by declining flux.

Ultrasound has significant advantages over traditional methods that control membrane fouling. For example, there are no chemicals used in the membrane cleaning process, and filtration is not interrupted to perform cleaning. In addition, this technique is useful for both large- and small-scale systems, and would require little maintenance. The maintenance of overall higher permeate fluxes reduces transmembrane pressures and total membrane area requirements.

In one embodiment provided is a membrane filtration system for filtering a liquid to be filtered. The membrane filtration system comprises a casing having flanges which support and sealingly close ends of the casing; an inlet conduit for introducing the liquid to be filtered into the casing; an outlet conduit for removing liquid concentrate from the casing; and an evacuation conduit for the egress of filtered fluid from the casing. The membrane filtration system further includes a membrane cell having a filtration membrane which filters the liquid to be filtered and permeates the filtered fluid to the evacuation conduit, and an ultrasonic transducer in direct contact with the liquid to be filtered and adapted to direct ultrasonic energy at the filtration membrane.

In another embodiment, a filtration circuit for filtering a liquid to be filtered is provided. The filtration circuit comprises a feed solution source; a pump adapted to pump feed solution from its source and provide the liquid to be filtered under pressure; and a membrane filtration system to receive the liquid to be filtered under pressure. The membrane filtration system includes a casing having flanges which support and sealingly close ends of the casing, an inlet conduit for the liquid to be filtered into the filtration system, an outlet conduit for removing liquid concentrate from the membrane filtration system, and an evacuation conduit for the egress of filtered fluid. The membrane filtration system further includes a membrane cell having a filtration membrane which filters the liquid to be filtered and permeates the filtered fluid to the evacuation conduit, and an ultrasonic transducer in direct contact with the liquid to be filtered and adapted to direct ultrasonic energy at the filtration membrane.

In still another embodiment a process for ultrasonic cleaning of a filtration system is provided. The filtration system includes a casing having flanges which support and sealingly close ends of the casing, an inlet conduit for introducing the liquid to be filtered into the casing, an outlet conduit for removing liquid concentrate from the casing, and an evacuation conduit for the egress of filtered fluid from the casing. The filtration system further includes a membrane cell having a porous filtration membrane which filters the liquid to be filtered and permeates the filtered fluid to the evacuation conduit, and an ultrasonic transducer in direct contact with the liquid to be filtered and adapted to direct ultrasonic energy at the filtration membrane. The process comprises emitting ultrasonic energy by means of the ultrasonic transducer in direct contact with the liquid to be filtered substantially perpendicular to the filtration membrane in such a manner as to liberate particles retained by the filtration membrane; and evacuating the particles liberated from the filtration membrane via the outlet conduit of the filtration system.

These and other features and advantages of the invention will be more fully understood from the following description of preferred embodiments of the invention taken together with the accompanying drawings. It is noted that the scope of the claims is defined by the recitations therein and not by the specific discussion of features and advantages set forth in the present description.

BRIEF DESCRIPTION OF THE DRAWINGS

In order to provide a good understanding of the invention, a description will now be given, by way of example, with reference to the accompanying drawings, of several embodiments of a filtration system according to the invention.

FIGS. 7(a) and 7(b) are perspective and side cross-sectional views, respectively, of an ultrasonically cleaned membrane cell of the filtration system according to another embodiment of the present invention having inside a membrane cell surrounding a transducer in direct contact with a liquid to be filtered.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiment(s) of the present invention.

DETAILED DESCRIPTION OF THE PREFERRED EMBODIMENTS

Figure 1:
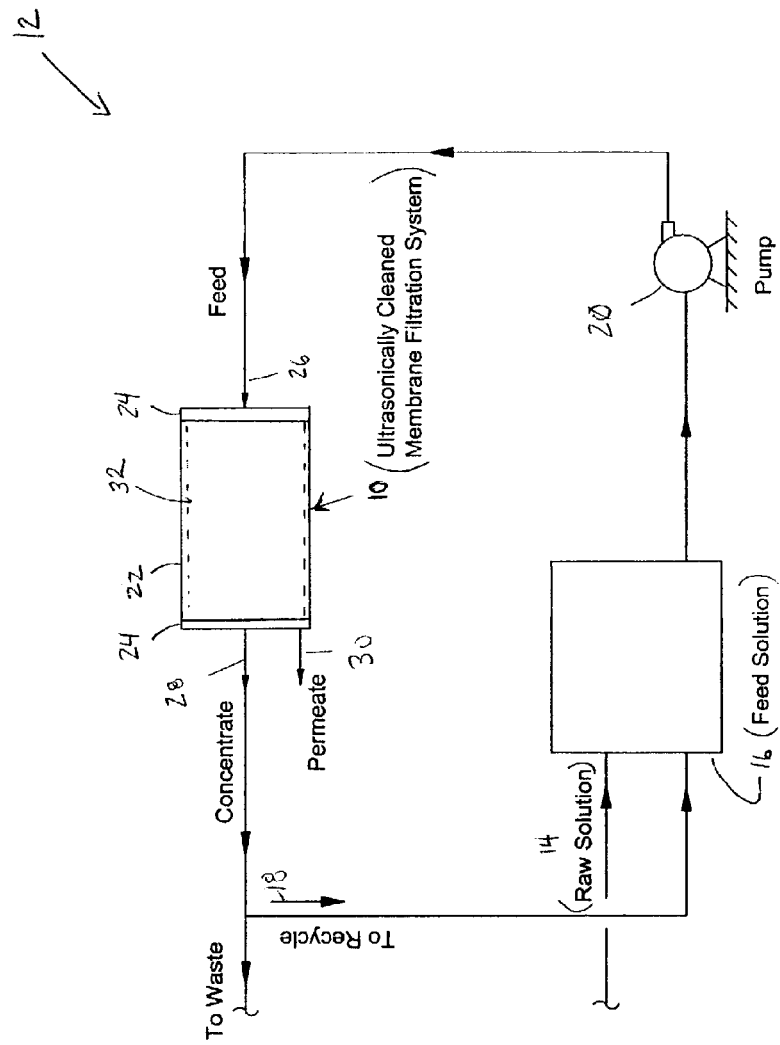
FIG. 1 is a schematic block diagram of an ultrasonically cleaned membrane filtration system incorporated into a filtration circuit according to an embodiment of the present invention.

FIG. 1 is a schematic block diagram of an ultrasonically cleaned membrane filtration system 10 incorporated into a filtration circuit 12 according to an embodiment of the present invention. The filtration system includes one or multiple ultrasonic transducer systems located adjacent to a filtration membrane in direct contact with a liquid to be filtered. Examples of different types of filtration membranes suitable for use with the present invention include, but not limited to, flat sheet, tubular, spiral wound and hollow fiber filtration membranes.

The filtration circuit 12 includes a raw solution source 14 connected to a feed solution source 16. In one embodiment, the raw solution and feed solution may be one in the same. In another embodiment, a recycle source 18 of concentrate exiting the membrane filtration system 10 and the raw solution source 14 may be combined to provide the feed solution source 16. A pump 20 pumps the feed solution source 16 to provide the liquid to be filtered under pressure to the membrane filtration system 10.

The membrane filtration system 10 comprises a casing 22 having flanges 24, which support and sealingly close the ends of the casing 22. The casing 22 further includes an inlet conduit 26 for the feed into the filtration system, and an outlet conduit 28 for removing liquid concentrate from the filtration system. As mentioned above, the concentrate may be recycled back to the feed solution source 16, or sent to waste. An evacuation conduit 30 is also provided for the egress of filtered fluid which permeates through a filtration membrane enclosed within casing 22. A membrane cell 32 is provided interiorly to the casing 22 which filters the liquid to be filtered and cleans the filtration membrane. A discussion of the various embodiments of membrane cells provided interiorly to the membrane filtration system 10 now follows with reference also made to FIGS. 2–8.

Figure 2A:
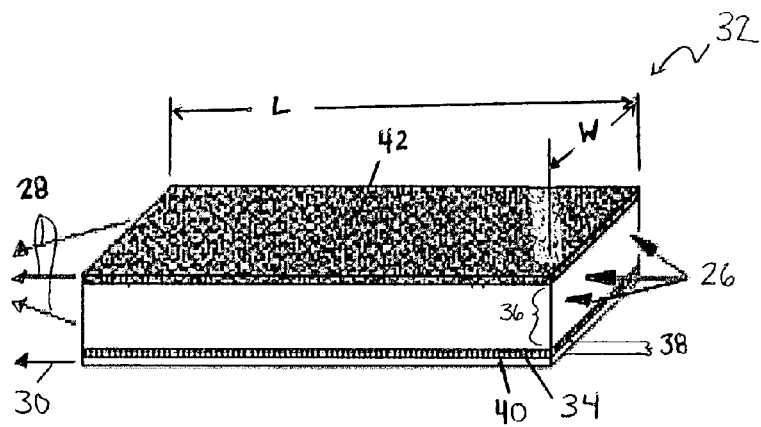
FIGS. 2(a) and 2(b) are perspective and side cross-sectional views, respectively, of an ultrasonically cleaned membrane cell of the filtration system according to an embodiment of the present invention having a flat sheet filtration membrane and a transducer in direct contact with a fluid to be filtered.
Figure 2B:
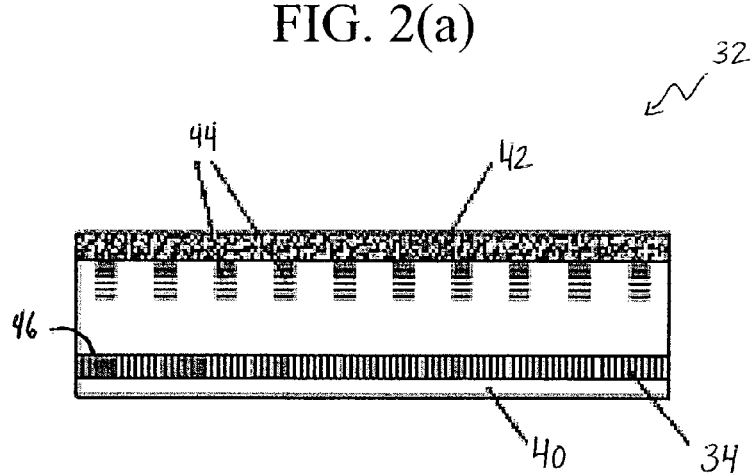

FIGS. 2(*a*) and 2(*b*) are perspective and side cross-sectional views, respectively, of an ultrasonically cleaned membrane cell 32 according to an embodiment of the present invention having a flat sheet filtration membrane 34. The filtration membrane 34 is provided within the casing 22 in such a manner as to occupy a longitudinal length L and width W of the casing, thereby dividing the casing in cross-section into first and second portions 36 and 38, respectively. This filtration membrane 34 comprises a porous material that may or may not be fixed to a membrane support 40. Suitable porous materials include but not limited to ceramic, polymeric, metallic, and combinations thereof. Suitable membrane supports 40 include but not limited to polyester, and propylene.

Inlet and outlet conduits 26, 28 (FIG. 1) open out on both sides of the membrane filtration system 10, in the axial direction of the casing 22. The fluid to be cleaned therefore passes through the wall of the filtration membrane 34 from the first portion 36 to the second portion 38 along the longitudinal length L of the casing 22 in the axial direction before emerging through the opening provided by the evacuation conduit 30. The arrangement of the inlet and outlet conduits 26 and 28, and the filtration membrane 34 and evacuation conduit 30 provides a cross-flow filtration system.

The membrane cell 32 further comprises an ultrasonic transducer 42 provided as the casing 22, a portion of the casing 22, or interiorly to the wall of the casing 22. In all embodiments, however, the transducer 42 is in direct contact with the feed solution. The ultrasonic transducer 42 is preferably piezoelectric based and when in service to clean the filtration membrane 34, emits ultrasonic energy of a frequency and power chosen to ensure in an effective manner the cleaning of the filtering element. Based on the properties of the feed solution, the ultrasound may be operated in either continuous, pulsed modes to maintain a high permeate flux or only periodically to clean the membrane surface with cycles of high flux followed by declining flux. Suitable ultrasonic transducers 42 include, but not limited to, piezoelectric, and magnetostrictive. In one exemplary embodiment, a piezoelectric based transducer 42 is operated in a frequency range of about 20 KHz to about 1 MHz, with a power intensity of about 0.21 W/cm$^2$ to about 2.5 W/cm$^2$ to clean a fouled ceramic filtration membrane.

As illustrated by FIGS. 2(*a*) and 2(*b*), the filtration membrane 34 is provided as a flat sheet and the ultrasonic transducer 42 is located opposite the surface of the filtration membrane 34. FIG. 2 (*b*) shows the longitudinal cross section of the membrane cell 32 and depicts the direction of the produced ultrasonic energy 44 when in operation. As ultrasonic energy 44 is emitted from the transducer 42, it moves directly toward and over the entire length of the surface 46 of the filtration membrane 34. It is to be appreciated that having the transducer 42 in direct contact with the feed solution requires less power to acoustically clean the pores of the filtration membrane 34 than if having to permeate through an intermediate structure, such as a pressure vessel, as with prior art systems. Further transducer 42 provides an area source of ultrasonic energy rather than a point source.

Figure 3A:
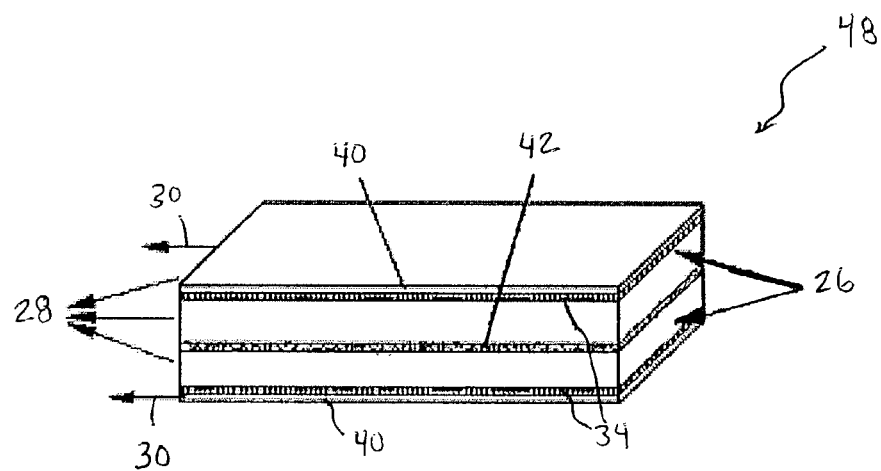
FIGS. 3(a) and 3(b) are perspective and side cross-sectional views, respectively, of an ultrasonically cleaned membrane cell of the filtration system according to another embodiment of the present invention having multiple flat sheet filtration membranes and a transducer in direct contact with the fluid to be filtered.
Figure 3B:
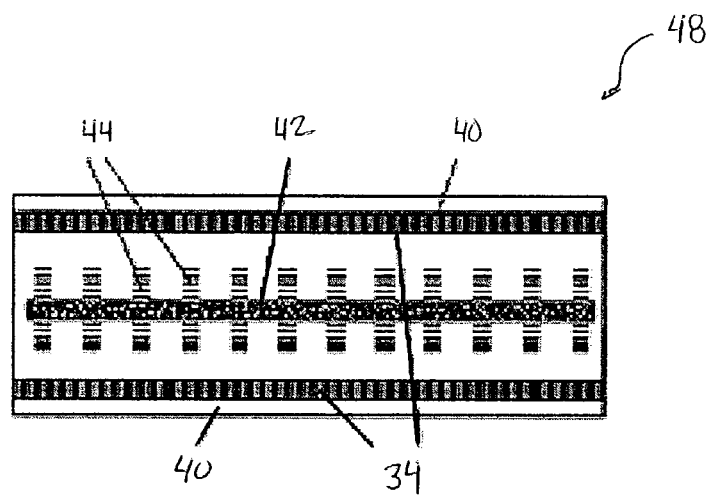

FIGS. 3(*a*) and 3(*b*) are perspective and side cross-sectional views, respectively, of an ultrasonically cleaned membrane cell 48 according to another embodiment of the present invention. Reference numerals which are the same as those used in FIGS. 2(*a*) and 2(*b*) represent the same components. In this embodiment, two or more flat sheet filtration membranes 34 face each other and form cross-flow channels. An ultrasonic transducer 42 is located between the filtration membranes 34 parallel to their surfaces and in direct contact with the feed solution. FIG. 3(*b*) shows the longitudinal cross section of the membrane cell 48, indicating the direction of emitted ultrasonic energy 44 when in use.

Figure 4A:
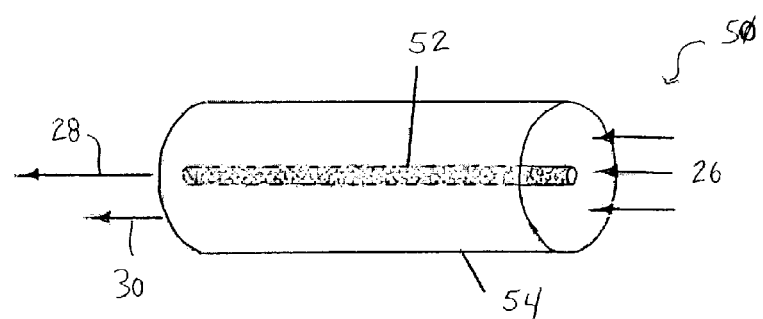
FIGS. 4(a) and 4(b) are perspective and side cross-sectional views, respectively, of an ultrasonically cleaned membrane cell of the filtration system according to another embodiment of the present invention having a transducer in direct contact with a liquid to be filtered and surrounded by a filtration membrane.
Figure 4B:
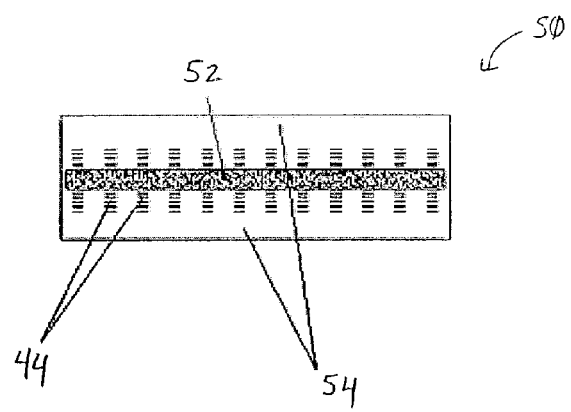

FIGS. 4(*a*) and 4(*b*) are perspective and side cross-sectional views, respectively, of an ultrasonically cleaned membrane cell 50 of the filtration system 10 according to another embodiment of the present invention having a cylindrically-shaped ultrasonic transducer 52 in direct contact with a liquid to be filtered and surrounded by a cylindrically shaped filtration membrane 54. Reference numerals which are the same as those used in FIGS. 2(*a*) and 2(*b*) represent the same components. In this embodiment, the ultrasonic transducer 42 is centrally located in the interior of the membrane cell 50 and extends substantially the longitudinal length of the filtration membrane 54. The transducer 52 in this embodiment emits ultrasonic energy 44 radially, as the filtration membrane 54 is a tubular membrane surrounding the ultrasonic transducer. For example, the filtration membrane 54 may be made of sintered stainless steel fiber media, sintered metal or ceramic powder elements, but other membrane types may be used including spiral wound and hollow fiber membranes. The permeate may be collected at the end of the membrane or along the length of the filtration membrane 54 depending on the membrane type being used.

Figure 5A:
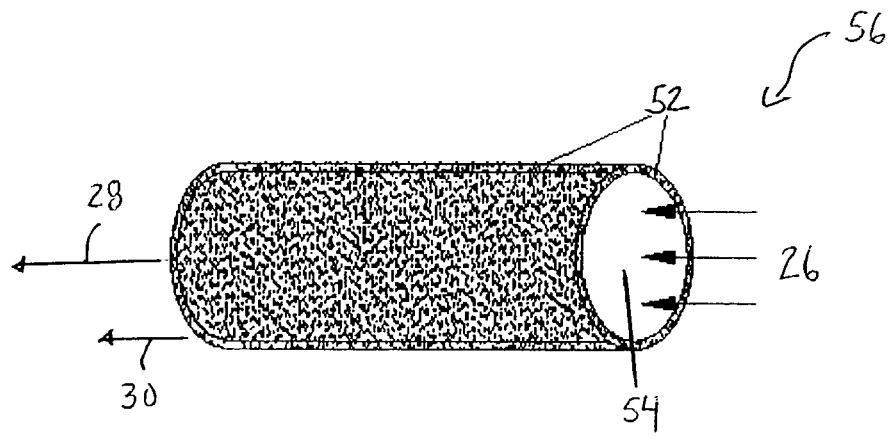
FIGS. 5(a) and 5(b) are perspective and side cross-sectional views, respectively, of an ultrasonically cleaned membrane cell of the filtration system according to another embodiment of the present invention having an ultrasonic transducer system surrounding a filtration membrane and in direct contact with a liquid to be filtered.
Figure 5B:
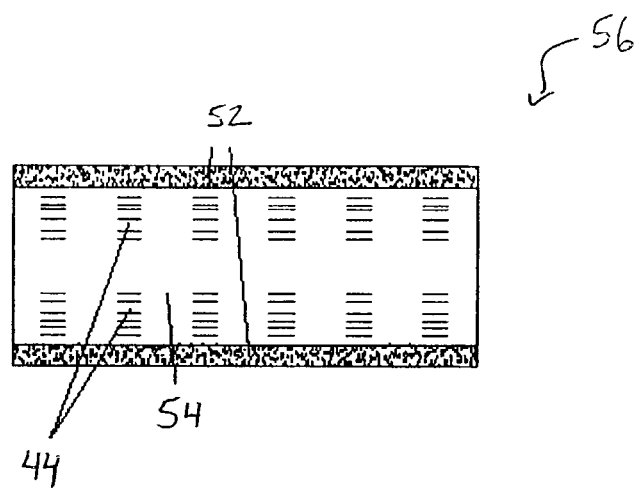

FIGS. 5(*a*) and 5(*b*) are perspective and side cross-sectional views, respectively, of an ultrasonically cleaned membrane cell 56 of the filtration system 10 according to another embodiment of the present invention having an ultrasonic transducer 52 surrounding the cylindrically shaped filtration membrane 54 and in direct contact with a liquid to be filtered. Reference numerals which are the same as those used in FIGS. 4(*a*) and 4(*b*) represent the same components. In this embodiment, the ultrasonic transducer 52 forms a shell around the filtration membrane 54, and emits ultrasonic energy 44 radially inward towards the filtration membrane 54 when in use. It is to be appreciated that the centrally located ultrasonic transducer 52 of the previous embodiment depicted in FIGS. 4(*a*) and 4(*b*) may also be advantageously provided in this embodiment. As with the previous embodiment, the permeate may be collected at the end of the filtration membrane 54 or along the length of the filtration membrane 54 depending on the membrane type being used.

Figure 6A:
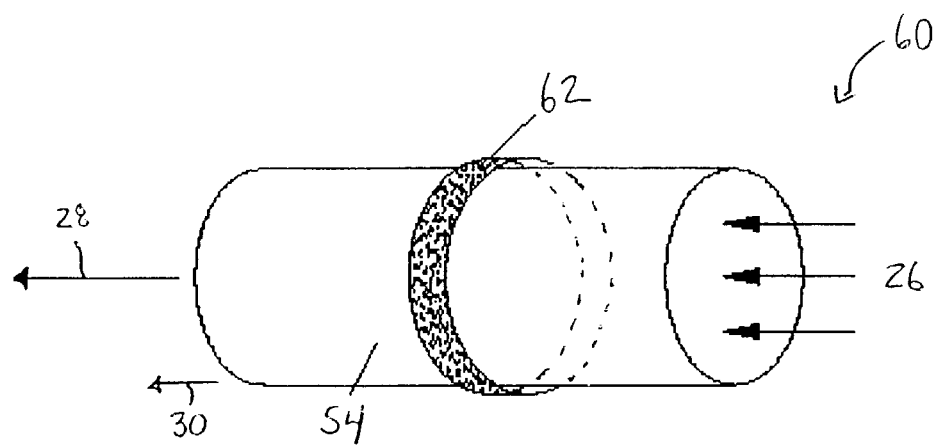
FIGS. 6(a) and 6(b) are perspective and side cross-sectional views, respectively, of an ultrasonically cleaned membrane cell of the filtration system according to another embodiment of the present invention having a transducer external to a membrane cell and being operable in a sweeping mode to emit ultrasonic energy radially inward.
Figure 6B:
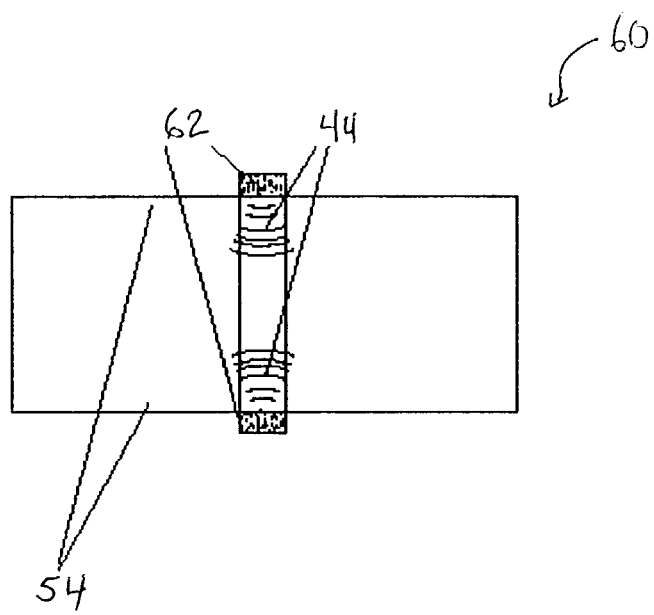

FIGS. 6(*a*) and 6(*b*) are perspective and side cross-sectional views, respectively, of an ultrasonically cleaned membrane cell 60 of the filtration system 10 according to another embodiment of the present invention. Reference numerals which are the same as those used in FIGS. 5(*a*) and 5(*b*) represent the same components. In this embodiment, the membrane cell 60 has a ring shaped transducer 62 surrounding the cylindrically shaped filtration membrane 54. As best seen by FIG. 6(*b*), the ring shaped transducer 62 is movable longitudinally along the length filtration membrane with the casing 22 to provide a sweeping mode when in use. The sweeping mode of the ring shaped transducer 62 emits ultrasonic energy radially inward and along the longitudinal length of the filtration membrane 54. It is to be appreciated that the centrally located ultrasonic transducer 52 of the previous embodiment depicted by FIGS. 4(*a*) and 4(*b*) may also be advantageously provided in this embodiment. As with the previous embodiment employing the cylindrically shaped filtration membrane, the permeate may be collected at the end of the filtration membrane 54 or along the length of the filtration membrane 54 depending on the membrane type used.

Figure 7A:
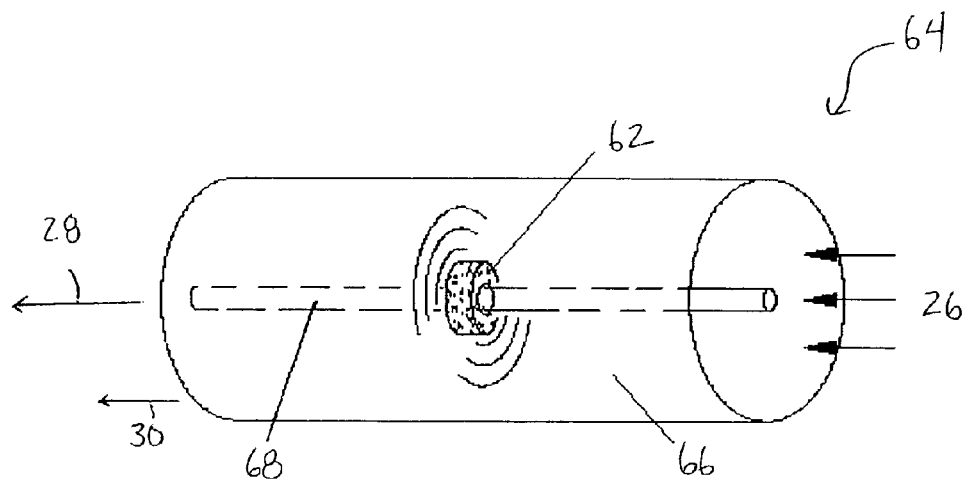
Figure 7A:
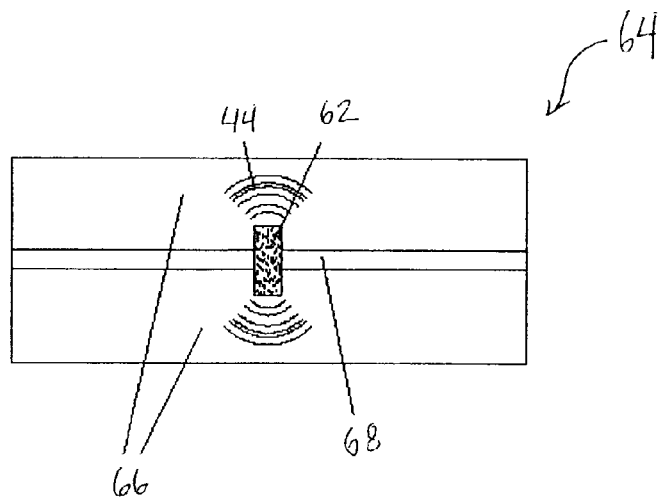

FIGS. 7(*a*) and 7(*b*) are perspective and side cross-sectional views, respectively, of an ultrasonically cleaned membrane cell 64 of the filtration system according to another embodiment of the present invention. Reference numerals which are the same as those used in FIGS. 6(*a*) and 6(*b*) represent the same components. In this embodiment, the ring shaped transducer 62 is provided on the inside of a tubular filtration membrane 66 in direct contact with a liquid to be filtered. The ring shaped transducer is supported within the filtration membrane by a transducer guide 68. As best seen by FIG. 7(*b*), the ring shaped transducer 62 is movable longitudinally along the length of the guide 68 centrally within the filtration membrane 66 to provide a sweeping mode when in use. The sweeping mode of the ring shaped transducer 62 emits ultrasonic energy radially outward and along the longitudinal length of the filtration membrane 66. It is to be appreciated that an exteriorly placed ring shaped transducer 62, such as disclosed by FIGS. 6(*a*) and 6(*b*), or a transducer shell 58 such as disclosed by FIGS. 5(*a*) and 5(*b*), may also be advantageously provided to this embodiment. As with the previous embodiment employing the cylindrically shaped filtration membrane, the permeate may be collected at the end of the filtration membrane 66 or along the length of the filtration membrane 66 depending on the membrane type being used.

Figure 8A:
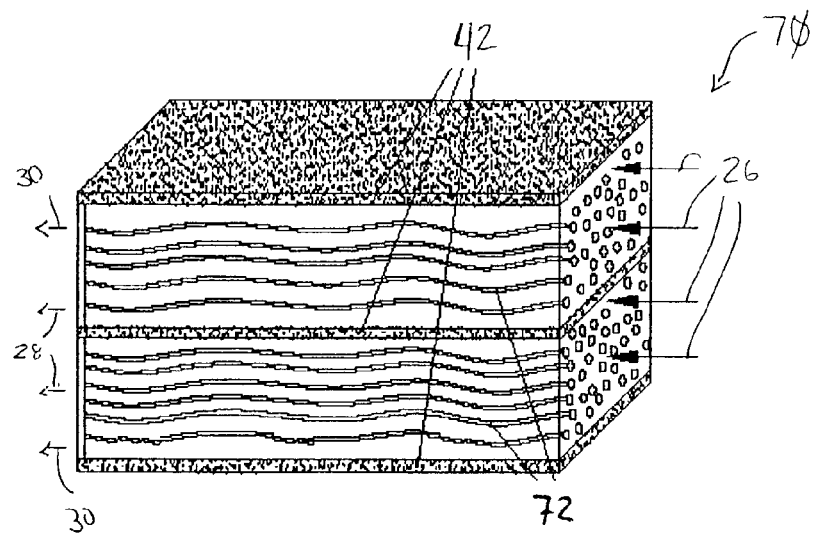
FIGS. 8(a) and 8(b) are perspective and side cross-sectional views, respectively, of an ultrasonically cleaned membrane cell of the filtration system according to another embodiment of the present invention having hollow fiber filtration membranes situated between transducer sheets which are in direct contact with a liquid to be filtered.
Figure 8B:
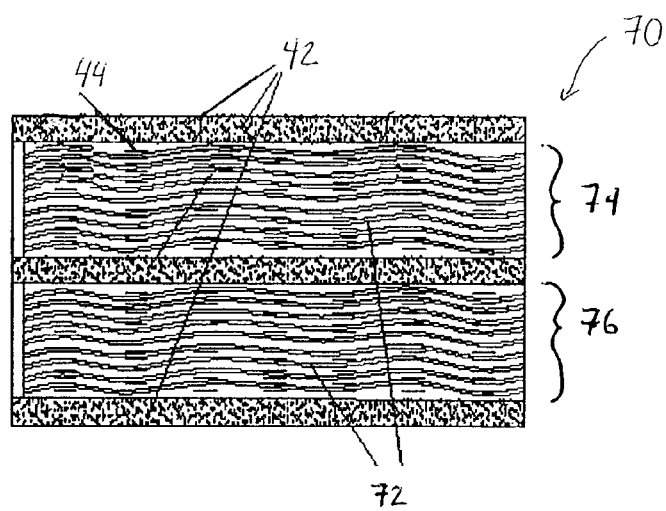

FIGS. 8(*a*) and 8(*b*) are perspective and side cross-sectional views, respectively, of an ultrasonically cleaned membrane cell 70 of the filtration system 10 according to another embodiment of the present invention. Reference numerals which are the same as those used in FIGS. 2(*a*) and 2(*b*) represent the same components. The membrane cell includes hollow fiber filtration membranes 72 situated between sheets of transducers 42 which are in direct contact with a liquid to be filtered. In the illustrated embodiment, there are provided first and second layers 74 and 76 of hollow fiber filtration membranes 72. However, it is to be appreciated that a plurality of layers of hollow fiber filtration membranes 72 sandwiched between a plurality of transducers 42 may be provided. In operation, the feed solution may either flow inside the hollow fiber filtration membranes 72 with permeate collected outside the hollow fibers, or alternatively, flow outside the hollow fiber filtration membranes 72 with permeate collected inside the hollow fibers.

As with the embodiment illustrated by FIG. 2 (*b*), ultrasonic energy 44 is emitted from the transducers 42 perpendicular to the direction of feed flow and through the entire lengths of the filtration membranes 72. If desired, other transducer systems may be used or combined to surround the hollow fibers or to emit ultrasonic waves radially and to optionally operate in a sweeping motion, such as with those embodiments depicted by FIGS. 4–7. Furthermore, if desired, any combination of the components disclosed in the embodiments depicted by FIGS. 2–8 may be integrated together into a transducer system according to the present invention.

The filtration system 10 of the invention comprising at least one of the membrane cells 32, 48, 50, 56, 60, 64, and 70 described in the above embodiments is very easy to maintain because the porous filtration membranes may be regenerated without any prior demounting due to the integral ultrasonic transducers. In order to carry out the regeneration, it is not necessary to isolate the filtration system from the filtration circuit on which it is intercalated. Thus, the system is self-cleaning in operation.

To clean the filtration system 10, the transducer(s) is supplied energy in such a manner as to generate ultrasonic energy which is transmitted through the fluid. The particles retained by the filtration membranes are removed/liberated from the surface and/or pores of these elements, in accordance with the phenomenon described previous in the Summary of the Invention, and carried away in the concentrate. When the cleaning has permitted the restoration of sufficient permeability of the filtration membrane, energy to the transducers may be terminated or maintained at a low intensity setting for continuous cleaning of the filtration membrane and/or to increase permeation through the creation of high velocity fluid in and around the surface of the filtration membrane. It is to be appreciated that sensors may be used with the above described membrane cell embodiments for the monitoring the degree of fouling and for automatically controlling the cleaning process when fouling reaches a preset level.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

We claim:

1. A membrane filtration system for filtering a liquid to be filtered comprising:
   a casing having flanges which support and sealingly close ends of the casing;
   an inlet conduit for introducing the liquid to be filtered into the casing;
   an outlet conduit for removing liquid concentrate from the casing;
   an evacuation conduit for the egress of filtered fluid from the casing;
   a membrane cell having a filtration membrane which filters the liquid to be filtered and permeates the filtered fluid to the evacuation conduit; said inlet and outlet conduits communicate with a first surface of said filtration membrane and said evacuation conduit communicates with a second surface of said filtration membrane, and an ultrasonic transducer in direct contact with the liquid to be filtered and adapted to direct ultrasonic energy at said filtration membrane, wherein said ultrasonic transducer has a ring shape and said filtration membrane has a cylindrical shape, and said ultrasonic transducer surrounds said filtration membrane, or is surrounded by said filtration membrane, and further comprising means for guiding movement of the transducer longitudinally along a length of the filtration membrane.

2. The membrane filtration system as recited by claim 1 wherein said ultrasonic transducer is piezoelectric and/or magnetostrictive based.

3. The membrane filtration system as recited by claim 1 wherein said filtration membrane is a porous filtration membrane.

4. The membrane filtration system as recited in claim 1 wherein said filtration membrane comprises material selected from the group consisting of ceramic, polymeric, metallic, and combinations thereof.

5. The membrane filtration system as recited by claim 1 wherein said inlet and outlet conduits open on both sides of the membrane filtration system in an axial direction of the casing.

6. The membrane filtration system as recited by claim 1 wherein the arrangement of the inlet and outlet conduits, the filtration membrane, and the evacuation conduit provides a cross-flow filtration system.

7. The membrane filtration system as recited in claim 1 wherein said ultrasonic transducer is surrounded by said filtration membrane and is movable along a guide within the filtration membrane.

8. A filtration circuit for a liquid to be filtered comprising:
   a feed solution source,
   a pump adapted to pump; the feed solution source and provide the liquid to be filtered under pressure, and
   a membrane filtration system to receive the liquid to be filtered under pressure, said membrane filtration system including:
   a casing having flanges which support and sealingly close ends of the casing,
   an inlet conduit for the liquid to be filtered into the filtration system,
   an outlet conduit for removing liquid concentrate from the membrane filtration system,
   an evacuation conduit for the egress of filtered fluid, and
   a membrane cell having a filtration membrane which filters the liquid to be filtered and permeates the filtered fluid to the evacuation conduit, and an ultrasonic transducer in direct contact with the liquid to be filtered and adapted to direct ultrasonic energy at said filtration membrane, wherein said ultrasonic transducer has a ring shape and said filtration membrane has a cylindrical shape, and said ultrasonic transducer surrounds said filtration membrane, or is surrounded by said filtration membrane, and further comprising means for guiding movement of the transducer longitudinally along a length of the filtration membrane.

9. The filtration circuit as recited by claim 8 further comprising a raw solution source connected to said feed solution source.

10. The filtration circuit as recited by claim 8 further comprising a recycle source of the liquid concentrate exiting the membrane filtration system such that a raw solution source is combined to provide the feed solution source.

11. The filtration circuit as recited by claim 8 wherein the liquid concentrate is recycled back to the feed solution source, or sent to waste.

12. The filtration circuit as recited in claim 8, wherein said ultrasonic transducer is surrounded by said filtration membrane and is movable along a guide within the filtration membrane.

13. The filtration circuit as recited in claim 8, wherein said ultrasonic transducer is piezoelectric and/or magnetorestrictive based.

14. The filtration circuit as recited in claim 8, wherein said filtration membrane comprises material selected from the group consisting of: polymeric, metallic, and combinations thereof.

15. The filtration circuit as recited in claim 8, wherein the arrangement of the inlet and outlet conduits, the filtration membrane, and the evacuation conduit provides a cross-flow filtration system.

16. A process for ultrasonic cleaning of a filtration system having a casing having flanges which support and sealingly close ends of the casing, an inlet conduit for introducing the liquid to be filtered into the casing, an outlet conduit for removing liquid concentrate from the casing, an evacuation conduit for the egress of filtered fluid from the casing, and a membrane cell having a porous filtration membrane which filters the liquid to be filtered and permeates the filtered fluid to the evacuation conduit, and an ultrasonic transducer in direct contact with the liquid to be filtered and adapted to direct ultrasonic energy at said filtration membrane, wherein said ultrasonic transducer has a ring shape and said filtration membrane has a cylindrical shape, and said ultrasonic transducer surrounds said filtration membrane, or is surrounded by said filtration membrane, and further comprising means for guiding movement of the transducer longitudinally along a length of the filtration membrane, the process comprising:
   emitting ultrasonic energy by means of said ultrasonic transducer in direct contact with the liquid to be filtered substantially perpendicular to said filtration membrane in such a manner as to liberate particles retained by said filtration membrane; and
   evacuating said particles liberated from the filtration membrane via the outlet conduit of said filtration system.

17. The process for ultrasonic cleaning of a filtration system as recited by claim 16 wherein said emitting ultrasonic energy is of a frequency and power chosen to ensure in an effective manner the cleaning of the filtration membrane.

18. The process for ultrasonic cleaning of a filtration system as recited by claim 16 wherein the ultrasonic transducer is operated continuously.

19. The process for ultrasonic cleaning of a filtration system as recited by claim 16 wherein the ultrasonic transducer is operated periodically.

20. The process for ultrasonic cleaning of a filtration system as recited by claim 16 wherein the ultrasonic transducer is operated in a sweeping mode.

* * * * *